(12) United States Patent
Crutchfield et al.

(10) Patent No.: US 6,801,959 B1
(45) Date of Patent: Oct. 5, 2004

(54) RELAXED-TIMING UNIVERSAL SERIAL BUS WITH A START OF FRAME PACKET GENERATOR

(75) Inventors: David Allen Crutchfield, Lexington, KY (US); Timothy John Rademacher, Lexington, KY (US); Galen Arthur Rasche, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 389 days.

(21) Appl. No.: 09/858,957

(22) Filed: May 16, 2001

(51) Int. Cl.[7] .............................................. G06F 13/14
(52) U.S. Cl. ........................... 710/30; 710/15; 710/18; 710/33; 710/34
(58) Field of Search ........................... 710/15, 18, 30, 710/33, 34

(56) References Cited

U.S. PATENT DOCUMENTS

| | | | |
|---|---|---|---|
| 4,506,361 A | * 3/1985 | Kume | ........................ 370/448 |
| 5,020,054 A | * 5/1991 | May, Jr. | ...................... 370/474 |
| 5,400,329 A | * 3/1995 | Tokura et al. | ............... 370/232 |
| 5,400,331 A | 3/1995 | Lucak et al. | |
| 5,590,122 A | 12/1996 | Sandorfi et al. | |
| 5,615,211 A | 3/1997 | Santore et al. | |
| 5,640,389 A | 6/1997 | Masaki et al. | |
| 5,912,895 A | 6/1999 | Terry et al. | |
| 5,933,611 A | * 8/1999 | Shakkarwar | ................. 710/100 |
| 5,974,486 A | 10/1999 | Siddappa | |
| 5,983,301 A | * 11/1999 | Baker et al. | ................. 710/113 |
| 6,067,591 A | * 5/2000 | Howard et al. | .............. 710/100 |

* cited by examiner

Primary Examiner—Rehana Perveen
(74) Attorney, Agent, or Firm—Needle & Rosenberg, P.C.

(57) ABSTRACT

An apparatus and method for controlling packet generation in a bus that couples a host to a plurality of devices. The apparatus includes a host controller for use with the bus and the host. The host controller has an SOF packet generator capable of delaying the generation of an SOF packet if there is another transaction occurring in the bus until the transaction is complete, thereby to relax the frame timing of SOF packet generation sequences.

24 Claims, 4 Drawing Sheets

RELAXED-TIMING UNIVERSAL SERIAL BUS WITH A START OF FRAME PACKET GENERATOR

BACKGROUND OF THE INVENTION

1. Field of the Invention

This invention generally relates to a host controller for use with a bus and a host in a digital system, such as a printer. More particularly, this invention relates to a host controller for use with a bus and a host that having a start of frame packet generator to relax frame timing of packet generation sequences.

2. The Prior Art

The personal computer industry has recently defined a new peripheral bus architecture and protocol, known as a Universal Serial Bus (USB). The architecture and protocol of the USB are defined in Compaq, et al., "Universal Serial Bus Specification", Rev. 1.1 (Sep. 23, 1998), and as used herein, a Universal Serial Bus is any bus which substantially conforms to that specification or to any subsequent revision thereof. Universal Serial Bus has also been utilized in other digital systems such as printers.

A Universal Serial Bus is organized in a "tiered star" topology, with a hub at the center of each star. A host controls the bus, and usually is connected immediately to a root hub. One or more "USB devices" are connected in a star topology to the root hub, and such USB devices can include keyboards, mice, joysticks, fax/modems, telephony devices, and so on. The term "USB device" as used herein also includes further hubs, which may themselves constitute the center of a topological star of further USB devices. Thus, each USB device is separated on the bus from the host by some number of hubs in the serial pathway between the host and the device. The USB specification specifies a maximum topology in which no device is separated from the host by more than six hubs including the root hub.

The USB specification allows users to add and remove USB devices from the bus at any time. Whenever a hub detects the addition or removal of a device, it so notifies the host, which then determines the new USB topology in a procedure known as enumeration.

Data is transferred on a Universal Serial Bus within one millisecond intervals called frames. Each frame begins with a "start of frame" (SOF) token or packet, issued by the host at one millisecond intervals and concludes with an "end of frame" (EOF) interval, during which no device is permitted to drive the bus. The intervening portion of each frame is referred to herein as a window during which bus transactions can take place.

The USB specification supports four different dataflow models, depending on the needs of each particular endpoint. An endpoint is a logical target within a device.

The four dataflow models are control transfers, bulk data transfers, interrupt data transfers and isochronous data transfers.

Control transfers are used for device configuration and can also be used for other device-specific purposes. Data delivery for control transfers is lossless.

Bulk transfers are usually used for larger amounts of data, such as for printers or scanners. Data delivery for bulk transfers is lossless, but the bandwidth that it occupies can be whatever is available and not being used for other transfer types.

Interrupt transfers are typically small, and may be presented for transfer by a device at any time. The device specifies a minimum rate (maximum number of frames of delay) at which the USB must deliver the data. Data delivery is lossless.

Isochronous transfers are for real time, time-sensitive delivery of data. An example of isochronous data is audio information. Such data must be delivered at the appropriate time, or errors are likely to result due to buffer or frame underruns or overruns. The Universal Serial Bus specification ensures timely delivery of isochronous data by assigning specific frame numbers to the data units to be transferred; if a data unit cannot be transferred in its designated frame number, the data unit is discarded.

According to the USB specification, higher level software in the host passes "transfer sets" to a host controller (which may be hardware and/or software), which divides the transfer sets into "transactions", each having a data payload size which is no greater than a predetermined maximum size for each of the four data transfer types. It is then up to the host controller to dynamically schedule these transactions for execution on the bus, in accordance with a number of rules. First, all isochronous transactions designated for a particular frame number must take place during that frame number or be discarded. Second, all interrupt transactions must take place within the time specified by the device. Third, all transactions to a particular endpoint must take place in the same sequence with which they are provided to the host controller, although there is no requirement that transactions destined for different endpoints take place in the same sequence with which they are provided to the host controller. Fourth, all transactions in a frame must complete before the EOF region of the frame.

As discussed above, USB uses 1 ms frames for bandwidth allocation and synchronization of devices on the bus. A USB host transmits an SOF packet every 1 ms at the beginning of each frame. The USB specification states that the frame interval must be 1.000 ms±500 ns. However, this tight tolerance on the frame interval is important only to some devices using isochronous dataflow transfers. Moreover, this rigid requirement often can increase the amount of logic required in the host controller and limit the bus throughout.

USB uses a suspended state to conserve power, which is managed through the generation of the SOF packets. A USB device on the bus enters the suspended state after keeping an idle state on the bus for 3 ms. During multiple frames over which the host has no communications with the device, the SOF packets keep the device from entering the suspended state. To enter the suspended state, the host stops the generation of the SOF packets and the device will be idle. After 3, the device will enter the suspended state. Thus, one purpose of the SOF packets for USB devices utilizing bulk and/or interrupt transfers is to keep the devices from entering the suspended state. Unlike USB devices using isochronous transfers, USB devices using bulk and/or interrupt transfers do not need tight and rigid timing on the frame interval. For these devices, relaxation of the tight timing on the frame interval may reduce the amount of logic required to generate an SOF packet and increase the overall performance.

Accordingly, there exists a need for a USB host controller that can relax frame timing with respect to the generation of the SOF packets.

SUMMARY OF THE INVENTION

The present invention provides an apparatus and method for controlling SOF packet generation and capable of relaxing the frame timing of SOF packet generation sequences. In one aspect, the invention is a method of controlling packet generation in a bus through a host controller, wherein the host controller includes a timer that outputs a count signal at a predetermined time interval and a count expiration signal and the bus couples a host to a plurality of devices. The method includes performing the steps of producing a request for generating an SOF packet, determining if there is another transaction occurring in the bus, generating an SOF packet if there is not another transaction occurring in the bus, and delaying the generation of an SOF packet if there is another transaction occurring in the bus until the transaction is complete.

In another aspect, the invention is a method of controlling SOF packet generation in a bus through a host controller, wherein the host controller includes a timer that outputs a count signal at a predetermined time interval and a count expiration signal and the bus couples a host to a plurality of devices. The method includes performing the steps of writing an SOF enable bit having a first value or a second value, determining the value of the SOF enable bit, receiving a count expiration signal, producing a request for generating an SOF packet when the value of the SOF enable bit is the first value, and generating an SOF packet. The first value can be chosen as one ("1"), and the second value can be chosen as zero ("0").

In yet another aspect, the invention is a host controller apparatus for use with a bus and a host, wherein the bus couples the host to a plurality of devices. The host controller has a microprocessor, a timer, and an SOF packet generator coupled to the microprocessor and the timer. The SOF packet generator can perform the steps of producing a request for generating an SOF packet, determining if there is another transaction occurring in the bus, generating an SOF packet if there is not another transaction occurring in the bus, and delaying the generation of an SOF packet if there is another transaction occurring in the bus until the transaction is complete. The microprocessor writes an SOF enable bit having a first value or second value and the timer outputs a count signal at a predetermined time interval and a count expiration signal to the SOF packet generator. The SOF packet generator produces the request for generating an SOF packet when the SOF enable bit has the first value, and maintains current count from the timer for at least one device in a suspended state when the SOF enable bit has the second value. In one embodiment of the invention, the first value is chosen as one ("1"), and the second value is chosen as zero ("0").

These and other aspects will become apparent from the following description of the preferred embodiment taken in conjunction with the following drawings, although variations and modifications may be effected without departing from the spirit and scope of the novel concepts of the disclosure.

DETAILED DESCRIPTION OF THE INVENTION

Figure 1:
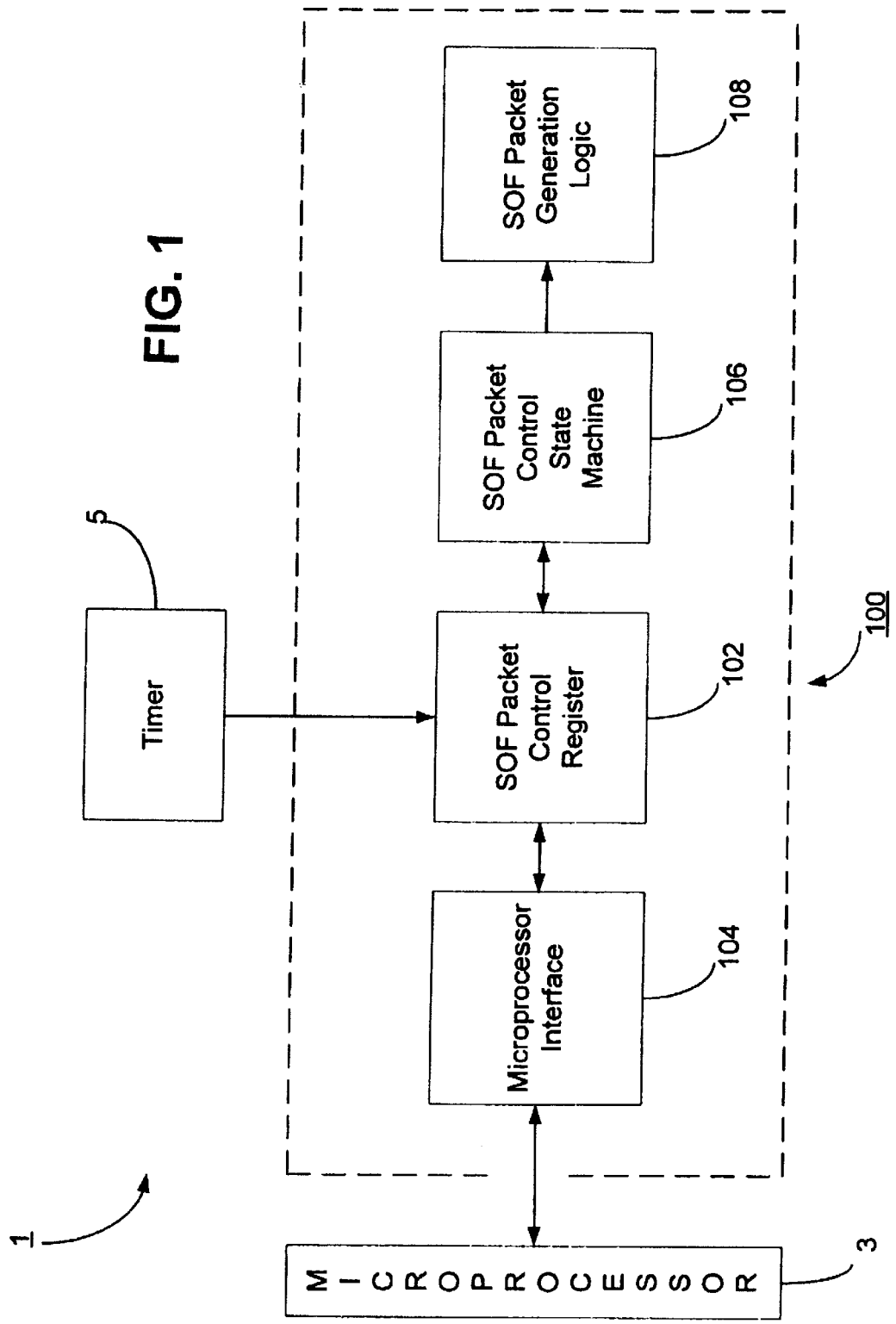
FIG. 1 is an overall block diagram of a hardware/software architecture of a USB host controller according to one embodiment of the invention.

The invention is now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

FIG. 1 is an overall block diagram of a hardware/software architecture of a USB host controller that can be used in digital devices such as a printer or a printing system including a copy machine, a fax machine, etc., according to one embodiment of the invention. As shown in FIG. 1, the invention is a USB host controller 1 that includes an SOF packet generator 100 connected to a microprocessor 3 and to a host timer 5.

The SOF packet generator 100 includes an SOF packet control register 102 that has logic circuitry. SOF packet control register 102 is controllable by the microprocessor 3 through a microprocessor interface 104. Additionally, the SOF packet control register 102 receives outputs from the host timer 5. The SOF packet generator 100 also includes an SOF packet control state machine 106 that is coupled to the SOF packet control register 102, and an SOF packet generation logic 108 that is coupled to the SOF packet control state machine 106. The SOF packet control state machine 106 communicates with the SOF packet control register 102 and the SOF packet generation logic 108. The SOF packet control state machine 106 can, among other functionality, receive, analyze, generate and transmit command signals from/to the SOF packet control register 102 and the SOF packet generation logic 108.

The host timer 5 is a constant interval timer. In other words, the host timer 5 is a free running timer that outputs a pulse as a count at a predetermined time interval, which is chosen as 1 ms per the USB specification for the embodiment shown in FIG. 1. Alternatively, a time interval other than 1 ms time interval may be used to practice the present invention. The host timer 5 also outputs a current count so that the count can be read by the microprocessor 3 to determine the frame time.

Through the microprocessor interface 104, which includes logic circuitry necessary to interface or handshake with a microprocessor, the microprocessor 3 can control reads of and writes to registers coupled to the USB host controller 1 including the SOF packet control register 102. The SOF packet control register 102 has one bit, an SOF enable bit, which can be written or set by the microprocessor 3 to have a first value or a second value. For the embodiment shown in FIG. 1, the first value of the SOF enable bit is chosen as one ("1") and the second value of the SOF enable bit is chosen as zero ("0"). Alternatively, the SOF enable bit can take other sets of values representing either of states yes-no, on-off, etc.

When the SOF enable bit is set to "1", the SOF packet control register 102 produces a request for generating an SOF packet to keep devices on the USB in normal operation mode. In other words, the SOF packet control register 102 prevents devices on the USB from entering a suspended state and thus impairing transaction efficiency. The request for generating an SOF packet is then output to the SOF packet control state machine 106. Additionally, the SOF packet control register 102 holds the request for generating an SOF packet until an SOF end signal is received from the SOF packet control state machine 106 as discussed in more detail below.

On the other hand, when the SOF enable bit is set to "0", the SOF packet control register 102 produces no request for generating an SOF packet. This effectively stops the generation of an SOF packet and lets devices on the USB enter a suspended state, which may be desirable when no device on the USB is active, or at the choice of the microprocessor 3. The SOF packet control register 102 maintains the current count from the timer 5, which the microprocessor 3 can access on a read-only basis. Thus, the host controller 1 is able to effectively manage the suspended states of peripheral devices on the USB by utilizing the SOF enable bit in connection with the SOF packet control register 102.

Upon receiving a request for generating an SOF packet from the SOF packet control register 102, the SOF packet control state machine 106 determines if there is another transaction currently occurring or underway in the bus. If no, the SOF packet control state machine 106 signals the SOF packet generation logic 108 to start an SOF packet. When the SOF packet generation logic 108 generates the SOF packet, the SOF packet control state machine 106 also outputs an SOF end signal to the SOF packet control register 102, which, upon receiving the SOF end signal, generates a signal to notify the microprocessor 3 that the SOF has occurred. In one embodiment, the signal to the microprocessor 3 is in the form of an interrupt request that is maskable under software control.

On the other hand, if there is another transaction currently occurring in the bus, the SOF packet control state machine 106 waits until the transaction is complete to signal the SOF packet generation logic 108 to start an SOF packet. When the SOF packet is sent, the SOF packet control state machine 106 also outputs an SOF end signal to the SOF packet control register 102 indicating that the SOF packet has been sent.

Thus, the frame timing with respect to the generation of SOF packets can be "relaxed" by the SOF packet control state machine 106 delaying the start of the next SOF packet until a transaction in progress ("TIP") is complete, as the generation of the next SOF packet may not coincide with the next 1 ms interval. This effectively extends the time window during which a device may drive the bus to perform a transaction and can improve the productivity of the bus.

Figure 4:
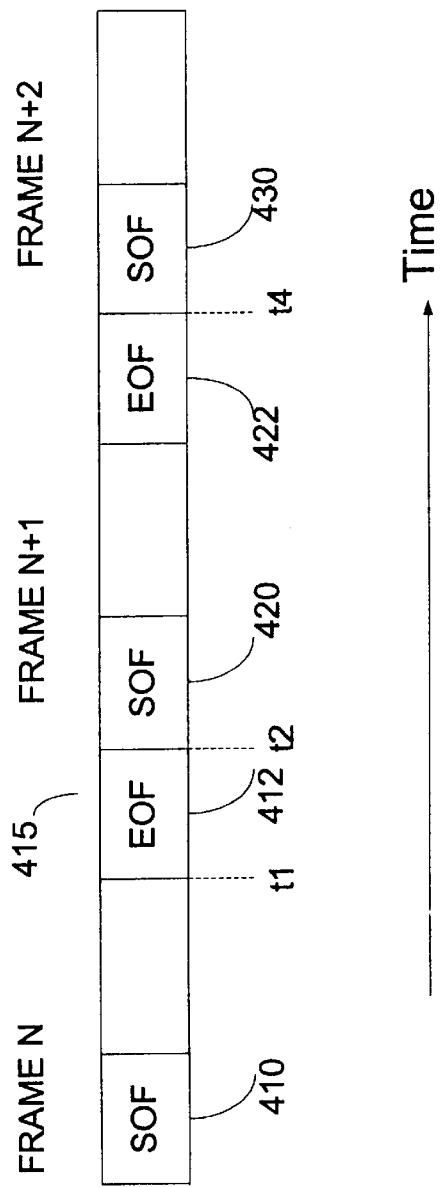
FIGS. 4 and 5 illustrate two examples of frame time usage related to the USB host controller of FIG. 1.
Figure 5:
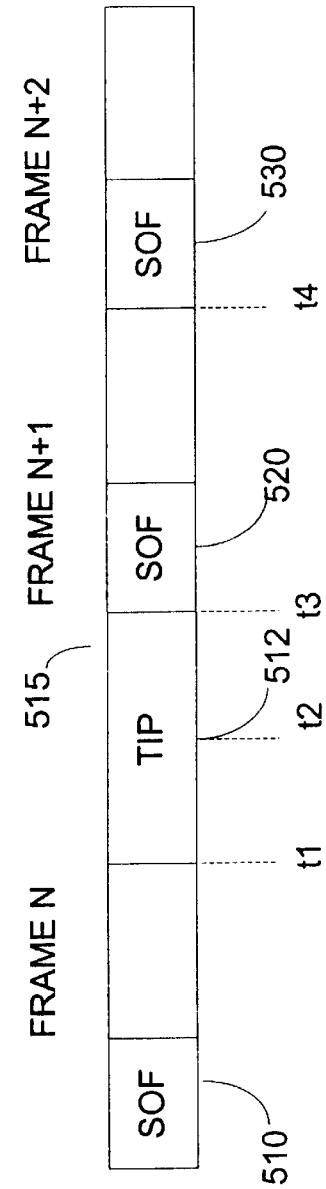

FIGS. 4 and 5 illustrate what is meant by relaxing the frame timing according to the present invention. In FIG. 4, frame N, where N is an integer, starts with an SOF packet in time period 410 and ends with the EOF interval in time period 412, and next frame N+1 starts with another SOF packet in time period 420 and ends with the EOF interval in time period 422. In reference to time, the EOF interval for the frame N starts at $t_1$ and ends at $t_2$, and the generation of the SOF packet for the frame N+1 starts at $t_2$. Likewise, frame N+1 starts with an SOF packet in time period 430 at $t_4$.

Referring now to FIG. 5, the present invention allows data transmission during the normal EOF interval. Therefore, there are no EOF intervals represented in FIG. 5. However, a TIP is depicted in time period 512 during the normal EOF interval. If the TIP is on the bus when a scheduled SOF packet time period arrives, the generation of the SOF packet for the N+1 frame does not start at $t_2$, but is delayed to a time $t_3$ when the TIP on the bus is complete. Thus, the time framing for the generation of the SOF packet of the N+1 frame is "relaxed" to $t_3$, and the TIP is given a larger time window to complete. The width defined by ($t_3$–$t_1$) is the additional time that the TIP has to complete, utilizing both the EOF time period and a small amount of time from the N+1 frame.

Because the operation of the timer 5 is independent of the start of the frame, the average frame interval will still be 1.0 ms over time while some frames are relaxed. One frame may be stretched by a transaction occurring at the end of the frame, and the next frame will be shortened if bus activity allows. This is illustrated in FIGS. 4 and 5. While the SOF packet in time period 520 for the N+1 frame in FIG. 5 was "relaxed" until $t_3$, the SOF packet for the N+2 frame in FIG. 5 starts at $t_4$ in time period 530. The corresponding time period 430 for the SOF packet in FIG. 4 also starts at $t_4$, thus maintaining the 1.0 ms average frame interval over time. Relaxing the SOF timing effectively utilizes the end-of-frame interval to increase the through put on the bus and to decrease the host controller's logic. Thus, the present invention can be utilized in digital devices that use bulk and interrupt transactions, which, unlike isochronous devices, do not require precise timing of the USB frame interval to improve the efficiency and productivity of the bus.

Furthermore, if it is needed to prevent the frame interval from varying, the microprocessor 3 can read the timer 5's count to determine the remaining frame time. If the frame time is insufficient for the next pending transaction, the microprocessor 3 can hold the execution of the transaction until after the timer 5's count has wrapped around. This will delay the transaction to the next frame and thus prevent a shift in the SOF timing.

Figure 2:
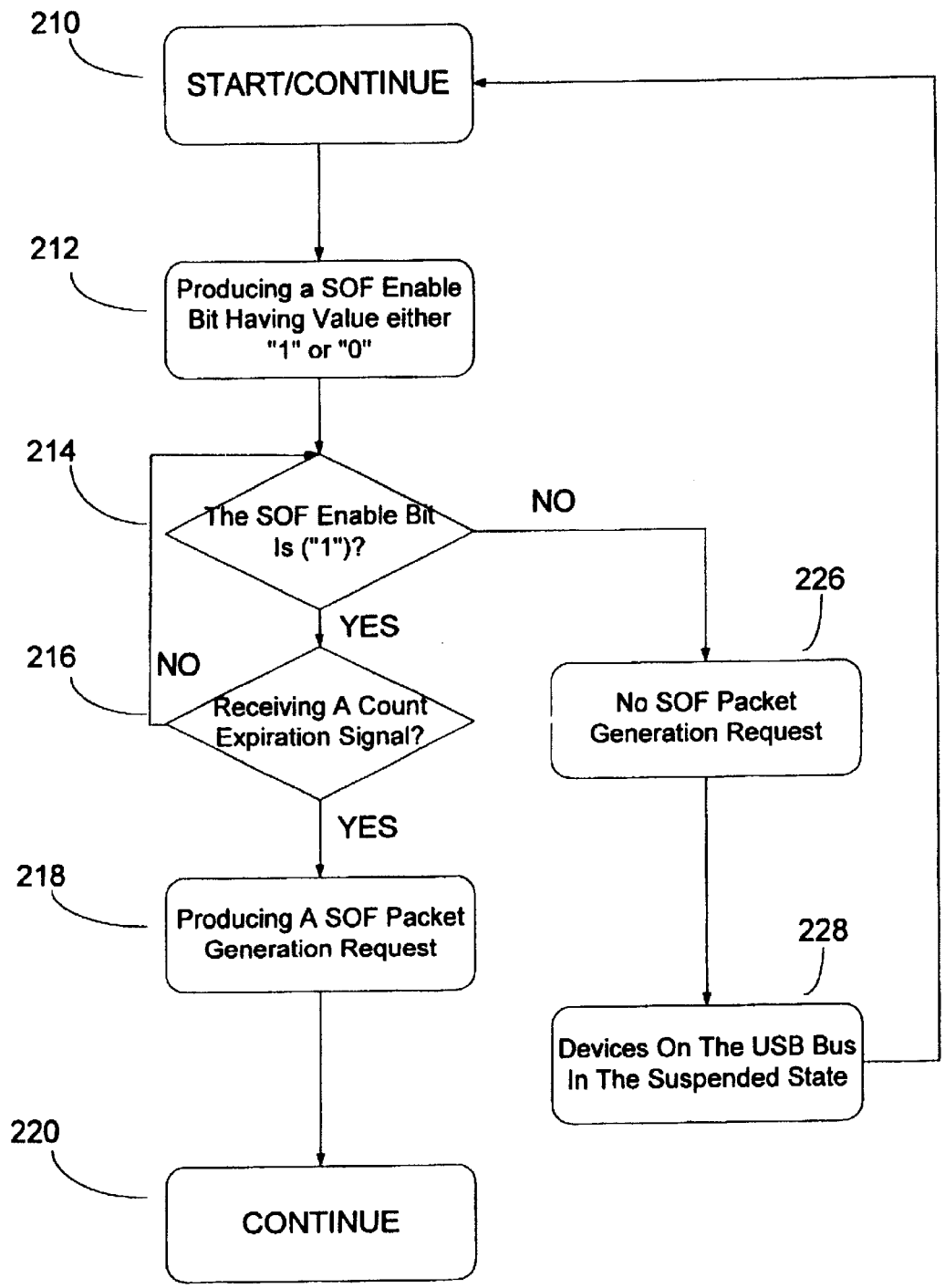
FIG. 2 is a flow chart describing a method employed in one embodiment of the invention.

FIG. 2 is a flow chart illustrating how the host controller 1 makes a request for generating an SOF packet starting at step 210. Specifically, in step 212, the microprocessor 3 through microprocessor interface 104 produces an SOF enable bit having value either "1" or "0" In step 214, it is determined whether the value of the SOF enable is one ("1"). If no, at step 226, the SOF packet control register 102 prohibits the generation of the request for generating an SOF packet, and thus no SOF packet is generated in response. At step 228, devices on the USB enter or remain in the suspended state. Then control returns to step 210 to proceed with the next cycle.

Still referring to FIG. 2, if it is determined that the value of the SOF enable is one ("1"), at step 216, it is determined whether the SOF packet control register 102 receives a count expiration signal from the timer 5. If not, control goes to step 214 to continue as discussed above, i.e., no SOF packet is generated in response. If yes, however, at step 218, a request for generating an SOF packet is produced, and at step 220, the request is output (to the SOF packet control state machine 106) for further processing.

Figure 3:
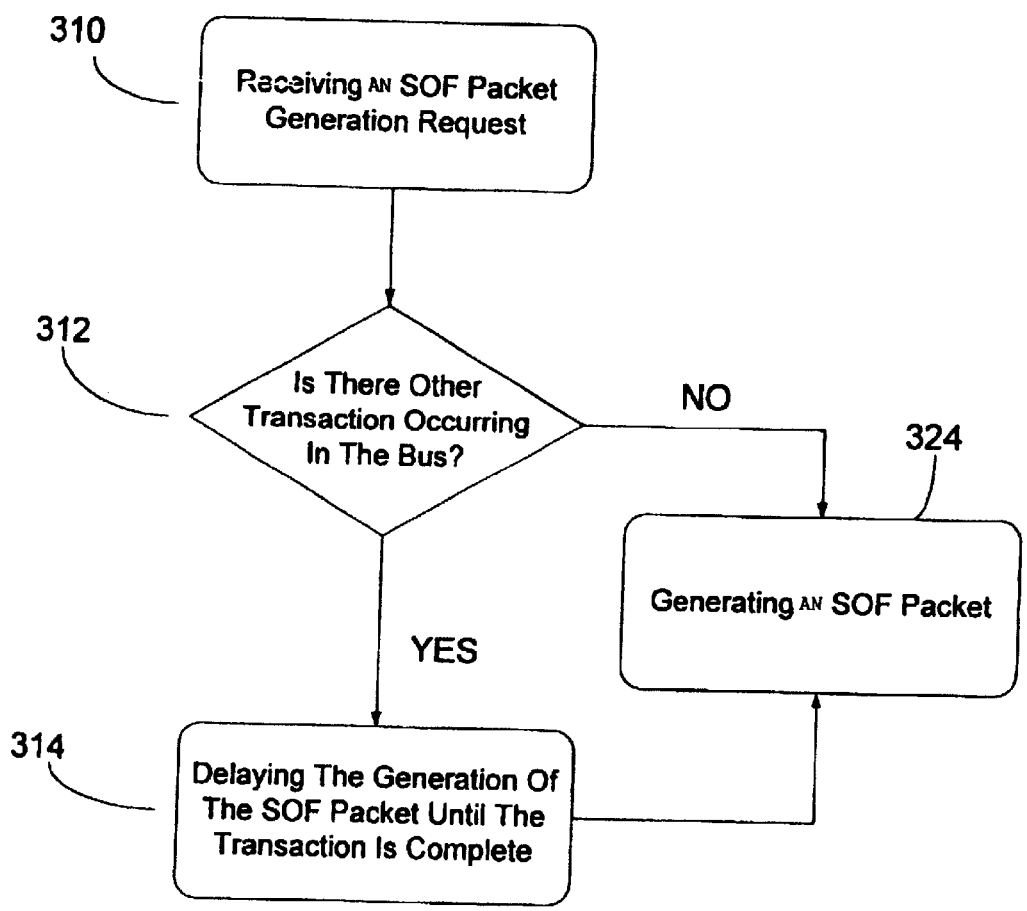
FIG. 3 is a flow chart describing a method employed in one embodiment of the invention.

FIG. 3 is a flow chart illustrating how an SOF packet is generated according to one embodiment of the present invention. Specifically, at step 310, a request for generating an SOF packet is received. At step 312, it is determined if there is another transaction occurring in the bus. If there is not, at step 324, an SOF packet is generated immediately. Referring to FIG. 4, it means that an SOF packet is generated at $t_2$.

If in step 312 it is determined that there is another transaction (i.e., a TIP) occurring in the bus, then in step 314 the generation of the SOF packet is delayed until the transaction is complete. Referring to FIG. 5, it means that the SOF packet 520 is not generated at $t_2$ and will be delayed to $t_3$. After the transaction is complete, control goes to step 324 and an SOF packet is then generated. Again referring to FIG. 5, it means that the SOF packet is generated at $t_3$ after the transaction is complete.

The above described embodiments are given as illustrative examples only. It will be readily appreciated that many deviations may be made from the specific embodiment disclosed in this specification without departing from the invention. Accordingly, the scope of the invention is to be determined by the claims below rather than being limited to the specifically described embodiment above.

What is claimed is:

1. A method of controlling packet generation in a bus through a host controller, wherein the host controller includes a timer that outputs a count signal at a predetermined time interval and a count expiration signal and the bus couples a host to a plurality of devices, comprising the steps of:
   a. producing a request for generating a "start of frame" (SOF) packet;
   b. determining if there is a transaction occurring in the bus;
   c. generating an SOF packet if there is no transaction occurring in the bus; and
   d. delaying the generation of an SOF packet if there is at least one transaction occurring in the bus until the transaction is complete;
wherein the SOF packet synchronizes the plurality of devices to the host.

2. The method of claim 1, further comprising a step of:
   e. generating an SOF packet after the transaction is complete.

3. The method of claim 1, wherein the producing step comprises:
   (i) writing an SOF enable bit having a first value or a second value;
   (ii) determining the value of the SOF enable bit;
   (iii) receiving a count expiration signal; and
   (iv) producing the request for generating an SOF packet when the value of the SOF enable bit is the first value.

4. The method of claim 3, wherein the first value of the SOF enable bit is one (1) and the second value of the SOF enable bit is zero (0).

5. The method of claim 3, further comprising a step of maintaining current count from the timer for at least one device in a suspended state when the value of the SOF enable bit is the second value.

6. A method of controlling packet generation in a bus through a host controller, wherein the host controller includes a timer that outputs a count signal at a predetermined time interval and a count expiration signal and the bus couples a host to a plurality of devices, comprising the steps of:
   (a) writing an SOF enable bit having a first value or a second value;
   (b) determining the value of the SOF enable bit;
   (c) receiving a count expiration signal;
   (d) producing a request for generating an SOF packet when the value of the SOF enable bit is the first value; and
   (e) generating an SOF packet;
wherein the SOF packet synchronizes the plurality of devices to the host.

7. The method of claim 6, wherein the generating step comprises:
   (i) determining if there is a transaction occurring in the bus;
   (ii) generating an SOF packet if there is no transaction occurring in the bus; and
   (iii) delaying the generation of an SOF packet if there is another transaction occurring in the bus until the transaction is complete.

8. The method of claim 7, further comprising a step of:
   (iv) generating an SOF packet after the transaction is complete.

9. The method of claim 6, wherein the first value of the SOF enable bit is one (1) and the second value of the SOF enable bit is zero (0).

10. The method of claim 6, further comprising a step of maintaining the current count from the timer for at least one device in a suspended state when the value of the SOF enable bit is the second value.

11. A host controller apparatus for use with a bus and a host, wherein the bus couples the host to a plurality of devices, comprising:
   a. means for producing a request for generating an SOF packet;
   b. means for determining if there is another transaction occurring in the bus;
   c. means for generating an SOF packet if there is no other transaction occurring in the bus; and
   d. means for delaying the generation of an SOF packet if there is at least one transaction occurring in the bus until the transaction is complete;
wherein the SOF packet synchronizes the plurality of devices to the host.

12. The apparatus of claim 11, further comprising means for generating an SOF packet after the transaction is complete.

13. The apparatus of claim 1, wherein the producing means performs the steps of:
   (i) writing an SOF enable bit having a first value or a second value;
   (ii) determining the value of the SOF enable bit;
   (iii) receiving a count expiration signal from a timer; and
   (iv) producing the request for generating an SOF packet when the value of the SOF enable bit is the first value.

14. A host controller apparatus for use with a bus and a host, wherein the bus couples the host to a plurality of devices, comprising:
   (a) means for writing an SOF enable bit having a first value or a second value;
   (b) means for determining the value of the SOF enable bit;
   (c) means for receiving a count expiration signal;
   (d) means for producing a request for generating an SOF packet if the value of the SOF enable bit is the first value; and
   (e) means for generating an SOF packet;
wherein the SOF packet synchronizes the plurality of devices to the host.

15. The apparatus of claim 14, wherein the generating means performs the steps of:
   (i) determining if there is another transaction occurring in the bus;
   (ii) generating an SOF packet if there is not another transaction occurring in the bus; and
   (iii) delaying the generation of an SOF packet if there is a transaction occurring in the bus until the transaction is complete.

16. The apparatus of claim 15, wherein the generating means further performs a step of:
   (iv) generating an SOF packet after the transaction is complete.

17. The apparatus of claim 14, wherein the first value of the SOF enable bit is one (1) and the second value of the SOF enable bit is zero (0).

18. The apparatus of claim 14, wherein the generating means comprises an SOF packet-control state machine and an SOF packet generation logic coupled to the SOF packet-control state machine.

19. A host controller apparatus for use with a bus and a host, wherein the bus couples the host to a plurality of devices, comprising an SOF packet generator performing the steps of:
   (i) producing a request for generating an SOF packet;
   (ii) determining if there is another transaction occurring in the bus;
   (iii) generating an SOF packet if there is not another transaction occurring in the bus; and
   (iv) delaying the generation of an SOF packet if there is a transaction occurring in the bus until the transaction is complete;
wherein the SOF packet synchronizes the plurality of devices to the host.

20. The apparatus of claim 19, further comprising:
   a. microprocessor coupled to the SOF packet generator; and
   b. a timer coupled to the SOF packet generator;
wherein the microprocessor writes an SOF enable bit having a first value or second value and the timer outputs a count signal at a predetermined time interval and a count expiration signal to the SOF packet generator, the SOF packet generator produces the request for generating an SOF packet when the SOF enable bit has the first value, and maintains current count from the timer for at least one device in a suspended state when the SOF enable bit has the second value.

21. The apparatus of claim 20, wherein the SOF packet generator comprises:
   a. an SOF control register coupled to the microprocessor and the timer;
   b. an SOF packet control state machine coupled to the SOF control register; and
   c. an SOF packet generation logic coupled to the SOF packet control state machine;
wherein the SOF packet control register produces the request for generating an SOF packet when the SOF enable bit has the first value, the SOF packet control state machine determines if there is another transaction occurring in the bus and outputs a packet-start signal if there is not another transaction occurring in the bus to the SOF packet generation logic, and the SOF packet generation logic generates an SOF packet in response.

22. The apparatus of claim 21, further comprising a microprocessor interface coupling the SOF control register to the microprocessor so as to allow the microprocessor to write the SOF enable bit in the SOF control register with the first value or the second value.

23. The apparatus of claim 19, wherein the first value of the SOF enable bit is one (1) and the second value of the SOF enable bit is zero (0).

24. The apparatus of claim 19, wherein the timer outputs a count signal at a 1 ms interval.

\* \* \* \* \*